US009870061B2

(12) United States Patent
Sugiyama et al.

(10) Patent No.: US 9,870,061 B2
(45) Date of Patent: Jan. 16, 2018

(54) INPUT APPARATUS, INPUT METHOD AND COMPUTER-EXECUTABLE PROGRAM (71) Applicant: Lenovo (Singapore) Pte. Ltd., Singapore (SG)

(72) Inventors: Jun Sugiyama, Kanagawa-ken (JP); Susumu Shimotono, Kanagawa-ken (JP); Ryohta Nomura, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 34 days.

(21) Appl. No.: 14/617,792

(22) Filed: Feb. 9, 2015

(65) Prior Publication Data
US 2015/0227214 A1 Aug. 13, 2015

(30) Foreign Application Priority Data

Feb. 10, 2014 (JP) .................................. 2014-023778

(51) Int. Cl.
*G06F 3/01* (2006.01)
*G06F 3/03* (2006.01)
*G06F 3/0354* (2013.01)

(52) U.S. Cl.
CPC ............ *G06F 3/017* (2013.01); *G06F 3/0304* (2013.01); *G06F 3/0354* (2013.01)

(58) Field of Classification Search
CPC .... G06F 1/1686; G06F 3/017; G06K 9/00335
See application file for complete search history.

(56) References Cited

U.S. PATENT DOCUMENTS

| 5,483,261 A | * | 1/1996 | Yasutake ............ G06K 9/00335 345/158 |
| 5,917,490 A | | 6/1999 | Kuzunuki et al. |
| 6,624,833 B1 | * | 9/2003 | Kumar .................... G06F 3/017 345/156 |
| 2009/0137269 A1 | | 5/2009 | Chung |
| 2011/0069181 A1 | * | 3/2011 | Lo ......................... G06F 1/1686 348/207.1 |
| 2011/0102570 A1 | | 5/2011 | Wilf et al. |
| 2012/0242793 A1 | * | 9/2012 | Im ........................... G06F 3/011 348/46 |
| 2013/0215148 A1 | * | 8/2013 | Antonyuk ............. G06T 19/006 345/633 |

FOREIGN PATENT DOCUMENTS

| CN | 1694056 A | 11/2005 |
| CN | 102216883 A | 10/2011 |
| CN | 103154858 A | 6/2013 |

(Continued)

*Primary Examiner* — Kevin M Nguyen
(74) *Attorney, Agent, or Firm* — Ference & Associates LLC (57) ABSTRACT

One embodiment provides a method, including: capturing, using a camera, an image of an object in contact with a hand of a user; determining, using a processor, that the hand of the user contacts the object; thereafter capturing, using the camera, controlling gesture input; detecting, within the controlling gesture input, a gesture that emulates use of a pointing device; and controlling an application running on an information handling device based on the controlling gesture input. Other aspects are described and claimed.

18 Claims, 6 Drawing Sheets

(56) References Cited

FOREIGN PATENT DOCUMENTS

| | | |
|---|---|---|
| EP | 1594040 A2 | 9/2005 |
| JP | H07175587 A | 7/1995 |
| JP | 2001265523 A | 9/2001 |
| JP | 2005321869 A | 11/2005 |
| JP | 2012068854 A | 5/2012 |
| JP | 2015519624 A | 7/2015 |
| TW | 1421732 B | 7/1997 |
| TW | 200945174 A1 | 11/2009 |
| WO | 2009059716 A1 | 5/2009 |
| WO | 2013126905 A2 | 8/2013 |

* cited by examiner

INPUT APPARATUS, INPUT METHOD AND COMPUTER-EXECUTABLE PROGRAM

CLAIM FOR PRIORITY

This application claims priority to Japanese Patent Application No. 2014-023778, filed on Feb. 10, 2014, which is fully incorporated by reference herein.

FIELD

The subject matter described herein generally relates to an input apparatus, an input method and a computer-executable program.

BACKGROUND

Screen operations and data inputting with information processing apparatuses are typically performed using a pointing device such as a mouse, a touch pad, a track point or a touch pen as well as a keyboard.

Recently a method using hand-gesture inputting is proposed as an input interface of the information processing apparatus. Such an input interface by hand gesture is to take an image of a hand and fingers using a camera, and recognize the gesture of the hand and fingers real time from the image taken to perform input processing based on the emulation of a mouse.

BRIEF SUMMARY

In summary, one aspect provides a method, comprising: capturing, using a camera, an image of an object in contact with a hand of a user; determining, using a processor, that the hand of the user contacts the object; thereafter capturing, using the camera, controlling gesture input; detecting, within the controlling gesture input, a gesture that emulates use of a pointing device; and controlling an application running on an information handling device based on the controlling gesture input.

Another aspect provides an apparatus, comprising: a camera; a processor operatively coupled to the camera; and a memory having instructions that are stored and executed by the processor to: capture, using the camera, an image of an object in contact with a hand of a user; determine, using the processor, that the hand of the user contacts the object; thereafter capture, using the camera, controlling gesture input; detect, within the controlling gesture input, a gesture that emulates use of a pointing device; and control an application running on an information handling device based on the controlling gesture input.

A further aspect provides an input apparatus, comprising: an input apparatus, comprising: a processor; and a memory having instructions that executed by the processor to: accept, from a camera, an image of an object in contact with a hand of a user; determine that the hand of the user contacts the object; thereafter accept controlling gesture input; detect, within the controlling gesture input, a gesture that emulates use of a pointing device; and control an application running on an information handling device based on the controlling gesture input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Screen operations and data inputting with information handling devices is typically performed using an input device such as a mouse, a touch pad, a track point, a touch pen, or a keyboard.

Recently, a method using hand-gesture input was proposed as an input interface for information handling devices. Such an input interface by hand gesture takes an image of a hand and fingers using a camera and recognizes the gesture of the hand and fingers from the image taken in real time, and performs input processing based on the emulation of a mouse. For example, see Japanese Patent Application Publication No. 2013-15877, Japanese Patent Application Publication No. 2010-2672200, and P. Mistry, Mouseless-a Computer Mouse as Small as Invisible (http://www.pranavmistry.com/projects/mouseless/.

However, the method of inputting by hand-gesture causes fatigue of an operator during long hours of work because nothing supports the hand, and the operation feeling is greatly different from a typical experience using a mouse. Additionally, no criterion exists for active/idle states of mouse functions when the hand gesture inputting is turned ON. Thus, if the operator unintentionally places their hand on the camera shooting range or moves their hand therein, such a motion may be a factor of a malfunction. Although the above discusses a mouse as the pointing device, a similar problem will occur for the emulation of other pointing devices by hand gesture.

In view of the above problems, an embodiment aims to provide an input apparatus, an input method, and a computer-executable program for improving the ease of use and creating less operator error when the input operation is emulated with a pointing device using the hand.

In order to solve the aforementioned problems and achieve the aim, an input apparatus according to an embodiment includes: an imaging device that takes an image of an object to acquire the image thereof; a processor that detects and analyzes the image acquired by the imaging device to detect whether a hand is in contact with a predetermined object or not, and when contact of the hand with the predetermined object is detected, detects at least one of movement of the predetermined object and a motion of the hand with respect to the predetermined object, and the operation instruction performs an input operation in accordance with the at least one of the movement of the predetermined objects, the motion of the hand with respect to the predetermined object detected to emulate an input operation with a pointing device.

In an embodiment, it is desirable that the detection include: plane detection that analyzes the image acquired by the imaging device and detects a motion plane on which the predetermined object moves; object detection that analyzes the image to detect the predetermined object; hand contact detection that, when the object detection detects the predetermined object, analyzes the image to detect whether a hand is in contact with the predetermined object or not; and motion detection that, when the hand contact detection detects a contact of the hand with the predetermined object, analyzes the image to detect at least one of the movement of the predetermined object and the motion of the hand with respect to the predetermined object.

An embodiment further includes a processor that utilizes the imaging device to take an image of the predetermined object, registers the predetermined object, and detects the predetermined object as registered by the registration process. In an additional embodiment, it is desirable that when it is detected that the hand released the predetermined object after the detection of the hand in contact with the predetermined object, then the detection of the movement of the predetermined object and the motion of the hand with respect to the predetermined object is stopped.

In another embodiment, the pointing device includes a mouse, and the operation instructions move a cursor in response to the movement of the detected predetermined object or perform a click operation of a left button or a right button in response to a first finger or a second finger operation with respect to the detected predetermined object. In a further embodiment, it is desirable that the imaging device include a 3D camera that acquires a three-dimensional image of the object.

Additionally, an input method, according to an embodiment, uses an input apparatus and includes: an imaging step of taking an image of an object to acquire the image thereof; a detecting step of analyzing the image acquired at the imaging step and detecting whether a hand is in contact with a predetermined object or not, and when a contact of the hand with the predetermined object is detected, detecting at least one of movement of the predetermined object and a motion of the hand with respect to the predetermined object; and an operation instruction step of performing an input operation in accordance with the at least one of the movement of the predetermined object and the motion of the hand with respect to the predetermined object detected at the detecting step to emulate an input operation with a pointing device.

According to another embodiment, a computer-executable program is loaded in an input apparatus, and the program makes a processor execute the following steps of: an imaging step of taking an image of an object to acquire the image thereof; a detecting step of analyzing the image acquired at the imaging step and detecting whether a hand is in contact with a predetermined object or not, and when a contact of the hand with the predetermined object is detected, detecting at least one of movement of the predetermined object and a motion of the hand with respect to the predetermined object; and an operation instruction step of performing an input operation in accordance with the at least one of the movement of the predetermined object and the motion of the hand with respect to the predetermined object detected at the detecting step to emulate an input operation with a pointing device.

According to a further embodiment, the input apparatus has the effect of providing an input apparatus improving the ease of use of a user and resulting in less operating error when the input operation is emulated with a pointing device using the hand.

The following describes an input apparatus, an input method and a computer-executable program according to an embodiment, with reference to the drawings. It can be easily understood that the components of an embodiment, which are generally shown in the drawings of the present specification, may have various configurations and may be designed to be in various ways of arrangement. That is, the following detailed descriptions of the embodiments of an apparatus, a method, and a program are not intended to limit the scope of the present invention recited in the claims. Instead, they are to simply illustrate the apparatus, the method, and the program of the selected embodiments without contradictions to the present invention recited in the claims. A person skilled in the art would appreciate that an embodiment can be implemented without one or more of the specific details or with another method, component or material.

Figure 1:
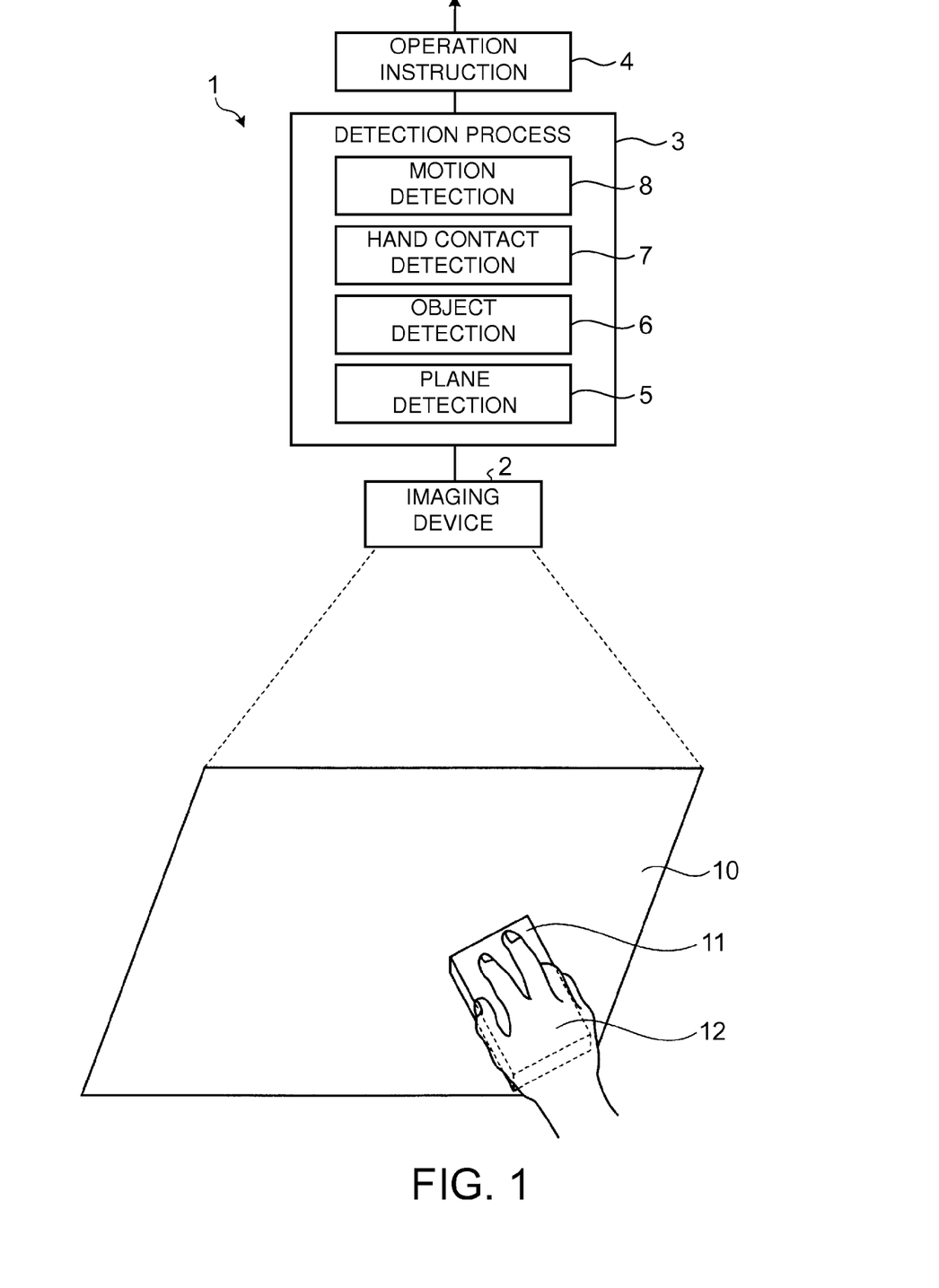
FIG. 1 illustrates the concept of an input apparatus according to an embodiment.

FIG. 1 illustrates the concept of an input apparatus according to an embodiment. An input apparatus 1 in FIG. 1 can be configured as the module of hardware or software, or the combination thereof. As illustrated in FIG. 1, the input apparatus 1 includes an imaging device 2, a detection process 3, and an operation instruction 4. For example, the imaging device 2 takes an image of an object (motion image) and outputs the image acquired for the detection process 3. The imaging device 2 may be a 3D camera, for example, which may be configured to acquire a three-dimensional image of the object.

The detection process 3 analyses an image acquired by the imaging device 2 to detect whether a hand 12 is in contact with a predetermined object 11 or not. When it is detected that the hand 12 is in contact with the predetermined object 11, the detection process 3 detects at least one of the movement of the predetermined object 11 and the motion of the hand 12 with respect to the predetermined object 11. The detection process 3 then outputs the detection result to the operation instruction 4. The predetermined object 11 is desirably one that a user can move on a desk, examples thereof include various objects, such as, an orange, a box, a mobile phone, a smartphone, a pen, and the like.

The operation instruction 4 performs an input operation in accordance with the at least one of the movement of the predetermined object 11 and the motion of the hand 12 with respect to the predetermined object 11 detected by the detection process 3, and emulates the input operation of a pointing device. This allows a user to move the predetermined object 11 with the hand 12 or operate the predetermined object 11 with the hand 12 to perform an input operation, similar to with a pointing device. Examples of a pointing device include a mouse, a touch pad, a track point, a touch pen, and the like.

Registration may be provided, which is configured to make the imaging device 2 take an image of the predetermined object 11 and register the predetermined object 11. In this case, the detection process 3 may detect the predetermined object 11 that is registered. This allows a user who registers a desired object and operates the predetermined object 11 to perform an input operation similar to a pointing device.

The detection process 3 may include: plane detection 5 that analyzes an image acquired by the imaging device 2 to detect a motion plane 10, on which the predetermined object 11 moves; object detection 6 that analyzes an image acquired by the imaging device 2 to detect the predetermined object 11; hand contact detection 7 that, when the object detection 6 detects the predetermined object 11, analyzes the image to detect whether the hand 12 is in contact with the predetermined object 11 or not; and motion detection 8 that, when the hand contact detection 7 detects a contact of the hand 12 with the predetermined object 11, detects at least one of the movement of the predetermined object 11 and the motion of the hand 12 with respect to the predetermined object 11 and outputs the detection result to the operation instruction 4. This enables the detection of the movement of the predetermined object 11 and the motion of the hand 12 with respect to the predetermined object 11.

When the detection process 3 detects the hand 12 released from the predetermined object 11 after the detection of the hand 12 in contact with the predetermined object 11, the detection process may stop the detection of the movement of the predetermined object 11 and/or the motion of the hand with respect to the predetermined object. This causes the detection to be stopped when the user releases the hand 12 from the predetermined object 11, thus the input operation can be stopped by the user when releasing the hand 12 from the predetermined object 11.

Additionally, a pointing device may be used to emulate a mouse. The operation instruction 4 may move a cursor in response to the movement of the predetermined object 11 detected by the detection process 3, or may perform a click operation of a left button or a right button in response to a first finger or a second finger operation with respect to the predetermined object 11. This enables an input operation using the predetermined object 11 and the hand 12 to mimic that of using a mouse.

When a cursor movement operation only is to be performed (e.g., for emulation of a touch pad), it may be configured to detect the movement of the predetermined object 11 only. When the click operation only is to be performed (e.g., for emulation of a click button of a touch pen), it may be configured to detect the finger operation only with respect to the predetermined object 11. That is, it may be configured to emulate a single operation to be performed with the predetermined object.

As described above, according to an embodiment, the imaging device 2 takes an image of an object to acquire the image, the detection process 3 analyses an image acquired by the imaging device 2 to detect whether a hand is in contact with a predetermined object or not. When it is detected that the hand is in contact with the predetermined object, the detection process 3 detects at least one of the movement of the predetermined object 11 and the motion of the hand with respect to the predetermined object 11. The operation instruction 4 performs an input operation in accordance with the at least one of the movement of the predetermined object 11 and the motion of the hand 12 with respect to the predetermined object 11 detected by the detection process 3, and emulates the input operation of a pointing device. This increases the ease of use for a user when emulating the input operation of a pointing device using their hand, and can prevent additional input that the user did not intend to make.

Figure 2:
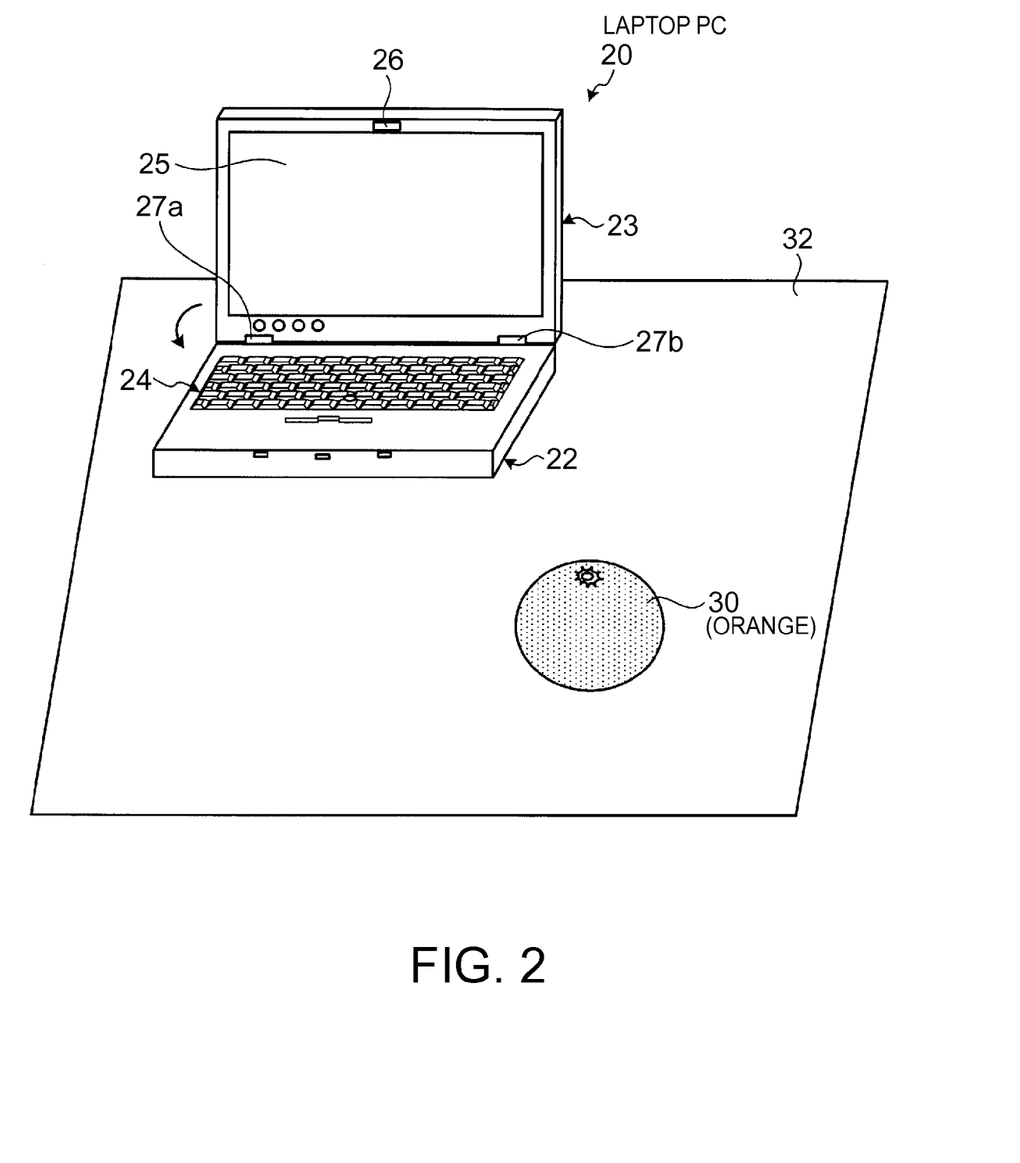
FIG. 2 schematically shows a view of a laptop that is an information handling device, to which the input apparatus according to an embodiment is applied.
Figure 3:
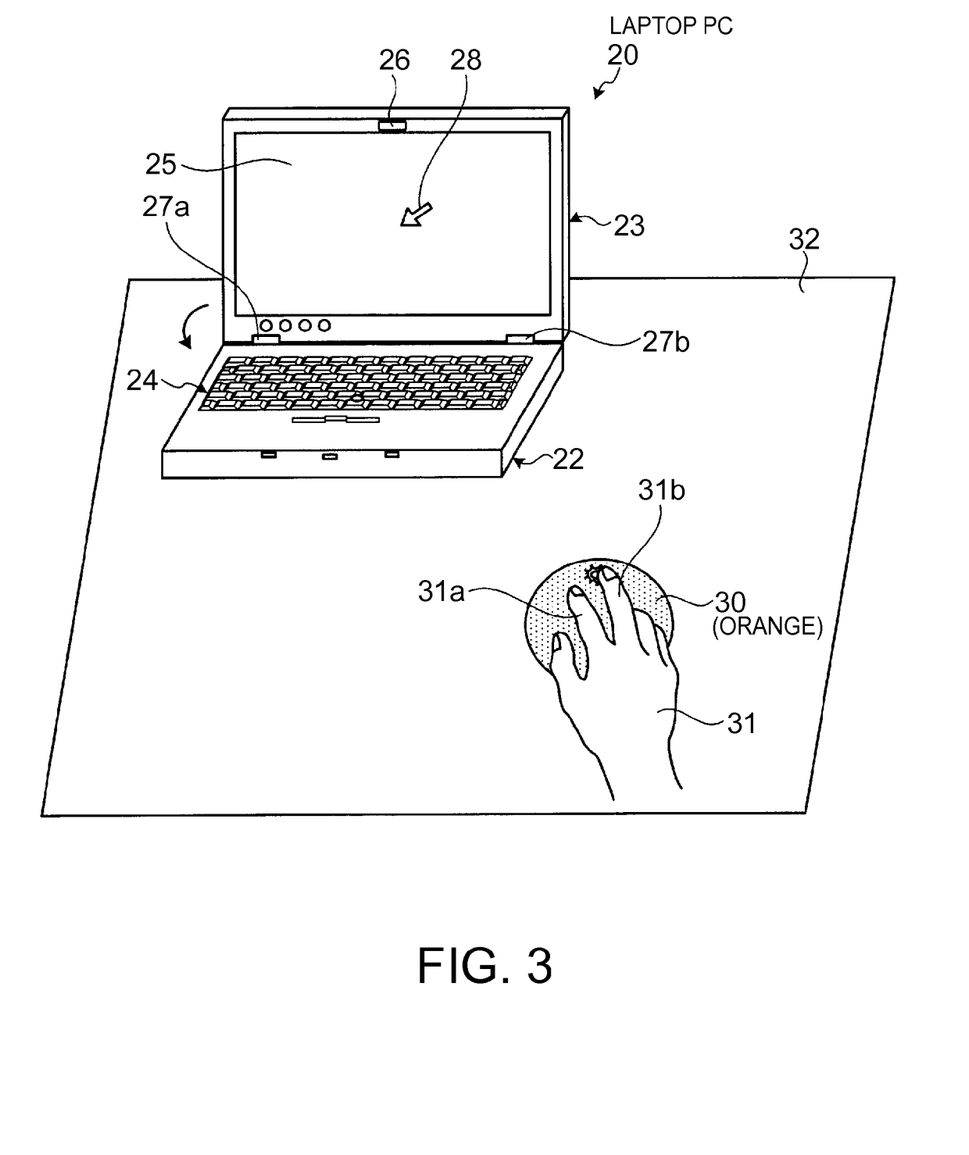
FIG. 3 schematically shows of a further view of a laptop that is an information handling device, to which the input apparatus according to an embodiment is applied.

FIGS. 2 and 3 schematically show the appearance of a laptop 20 that is an information handling device, to which the input apparatus according to an embodiment is applied. As illustrated in FIG. 2, the laptop 20 includes a main-body chassis 22 and a display chassis 23, each having a substantially rectangular parallelepiped shape. The main-body chassis 22 includes an input unit 24 having a keyboard, a touch pad or the like. The display chassis 23 includes a LCD (liquid crystal display) 25 and a 3D camera 26 that is disposed at the substantially center and above the LCD on the display face side of the LCD 25. The 3D camera capable of taking an image of an object in front. The 3D camera 26 can be, for example, be a stereo camera.

Additionally, the main-body chassis 22 and the display chassis 23 are jointed at their end parts with a pair of left and right joint parts (hinge parts) 27a and 27b, and the joint parts 27a and 27b support these chassis in opening and closing.

As stated above, a method of emulating a mouse operation by hand gesture causes fatigue of a user's hand during long hours of work because nothing supports the hand, and the feeling of operation is greatly different from the typical experience of using a mouse. In an embodiment, a mouse operation is emulated based on the operation of a HID object with a hand, meaning less fatigue of the hand during long hours of work and enabling the same feeling for the input operation as that of the operation with a mouse because the HID object supports the hand. The following describes an exemplary case where an orange is used as a HID object 30.

As illustrated in FIG. 2, the user places a desired HID object 30 on a motion plane 32, and takes an image of the HID object 30 with a 3D camera 26 to register the HID object 30. As illustrated in FIG. 3, the user holds the registered HID object 30 with a hand 31 and moves the object 30 with the hand on the motion plane 32 to move a cursor 28 displayed on the LCD 25, or presses the HID object 30 with fingers 31a, 31b of the hand 31 to perform left and right click operations.

Figure 4:
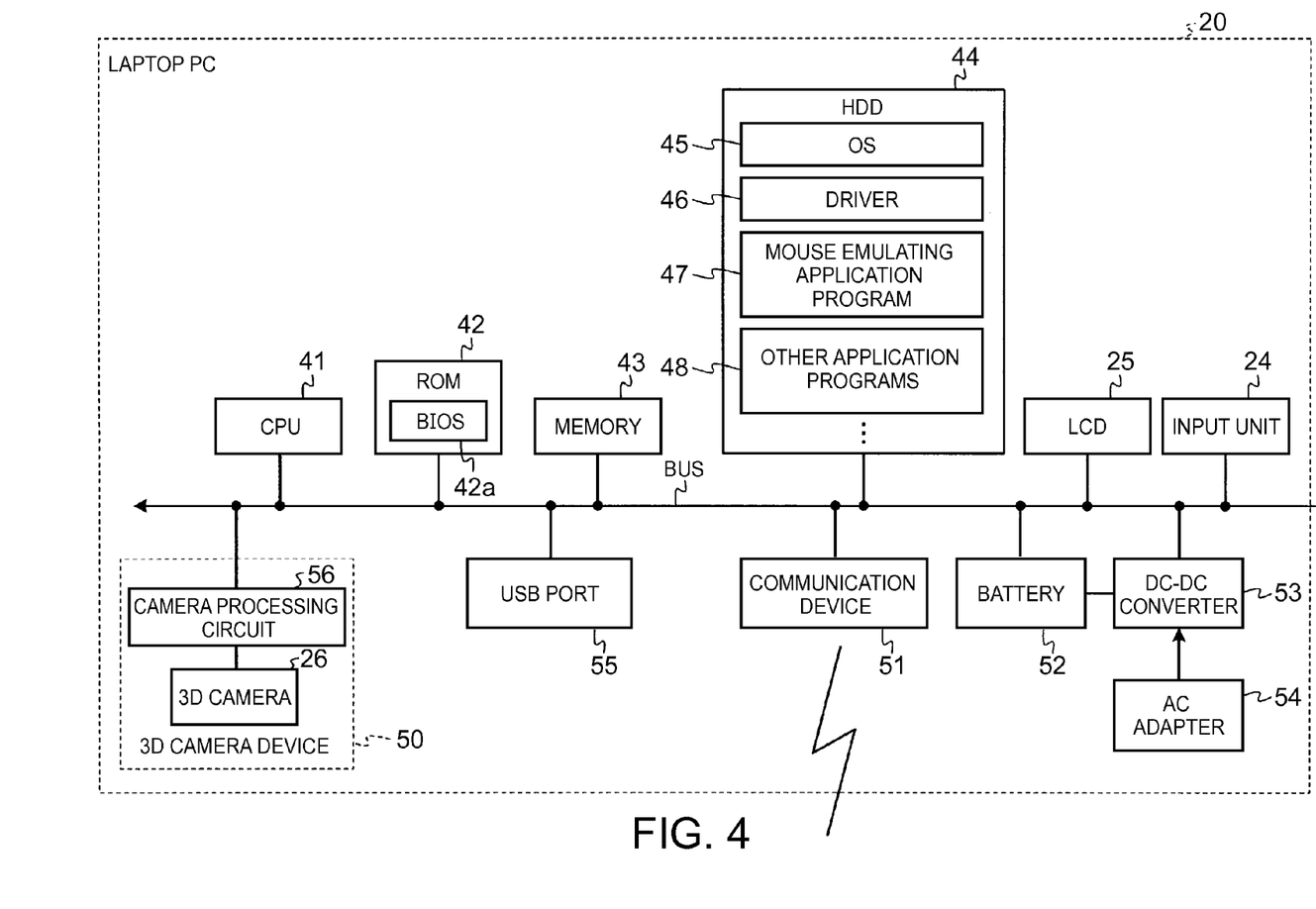
FIG. 4 schematically illustrates an example hardware configuration of an information handling device.

FIG. 4 schematically illustrates an example hardware configuration of the laptop 20. As illustrated in this drawing, the laptop 20 includes a CPU 41, a ROM 42, a memory 43, a HDD (hard disk) 44, the LCD 25, the input unit 24, a 3D camera device 50, a communication device 51, a battery 52, a DC-DC converter 53, an AC adapter 54, a USB port 55 and the like, and these parts are connected directly or indirectly via a bus.

The CPU 41 controls the laptop 20 as a whole by an OS (operating system) 45 stored in the HDD 44 that is connected via a bus, and has a function to execute processing in accordance with various programs stored in the HDD 44. The ROM 42 stores BIOS (Basic Input/Output System) 42a, data and the like.

The memory 43 is made up of a cache memory and RAM, which is a writable memory as a read-in area of an execution program of the CPU 41 and a work area in which processing data of the execution program is written.

The HDD 44 has a function to store the OS 45 to control the laptop 20 as a whole, such as Windows® XP, Vista, 7, or 8, various types of drivers 46 for hardware operations of peripheral devices, a mouse emulating application program 47 and other application programs 48 for specific jobs.

The OS 45 controls the basic operation of the laptop 20, and manages various resources. For instance, the OS transmits an instruction generated from an application program to the various types of drivers 46 and the BIOS 42a. The OS 45 is equipped with a multi-task function and a multi-window function, and is configured to manage software resources as well, such as execution context of an application program (register set, a main memory image, a file handle and the like that a certain application program uses) and GUI components. The OS 45 intervenes in exchange of data or a command between an application program and each device driver.

The various types of drivers 46 include a display driver that controls the LCD 25 in accordance with an instruction of the OS 45, a camera driver that controls the 3D camera device 50 in accordance with an instruction of the OS 45, a mouse driver that controls a mouse in accordance with an instruction of the OS 45, a communication driver that controls the communication device 51 in accordance with an instruction of the OS 45, and the like.

The mouse emulating application program 47 is to allow a user to operate the registered HID object 30 with a hand so as to perform the input operation similarly to using a mouse. The other application programs 48 include programs for a browser, mail, word processing, spreadsheet, and the like.

The LCD 25 is configured to convert display information into video signals under the control of the CPU 41, and display various types of information in accordance with the converted video signals on its display screen. An embodiment includes an LCD as the display, which is not a limiting example of the embodiment, which may include other displays such as an organic EL display and a CRT.

The input unit 24 is a user interface to allow a user to perform an input operation, examples include, a keyboard made up of various types of keys for inputting letters and commands, a touch pad to allow a user to move a cursor on the screen or to make various selections from a menu, and the like.

The 3D camera device 50 includes the 3D camera 26 such as a stereo camera, and a camera processing circuit 56. The 3D camera 26 includes a lens and an imaging unit (CCD or CMOS), where the lens images light from an object, and the imaging unit outputs the imaged light from the object as an image signal of R, G and B. The camera processing circuit 56 includes an A/D converter, an image processing LSI, and a memory, which controls driving timing or exposure of the imaging unit, and performs signal processing (including creation processing of a 3D image) of the image signals of R, G and B obtained by the imaging unit, and outputs the 3D image to the CPU 41.

The communication device 51 is to transmit and receive data via a network, for example, to transmit image data and audio data to a network and receive image data and audio data transmitted via a network. The communication device 51 may transmit image data and audio data that are encoded, and when receiving encoded image and audio data, the communication device may decode them. To the USB port 55, a USB device (e.g., a USB mouse) can be connected.

The AC adapter 54 is connected to a commercial power supply, and converts AC voltage to DC voltage and outputs the resultant to the DC-DC converter 53. The DC-DC converter 53 converts DC voltage supplied from the AC adapter 54 into predetermined voltage, and supplies electricity to various parts of the laptop, or charge the battery 52. The battery 52 is charged by the DC-DC converter 53, and supplies the voltage charged to various parts. The battery 53 is used when the AC adapter 54 is not connected to a commercial power supply.

Figure 5:
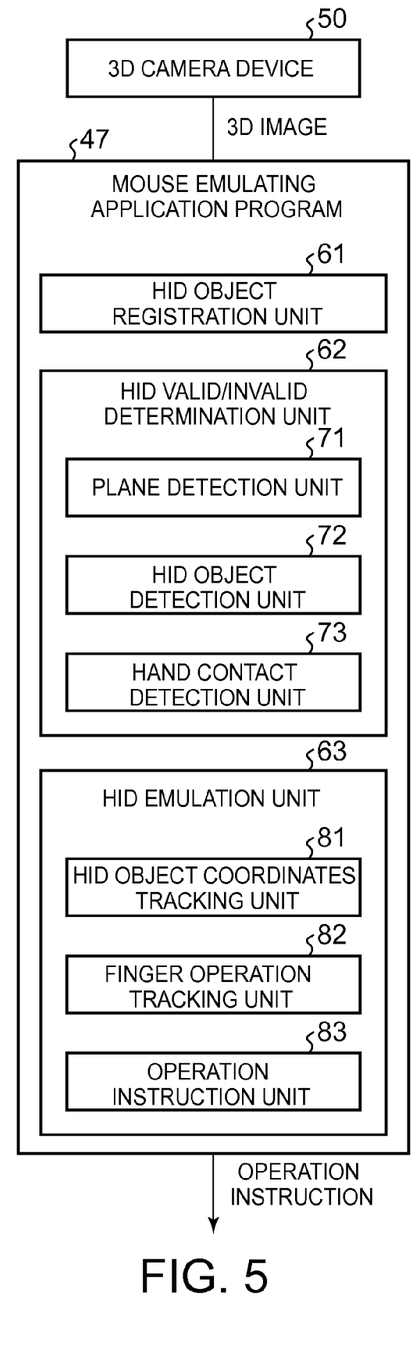
FIG. 5 illustrates an embodiment of a functional configuration of a mouse emulation application program.
Figure 6:
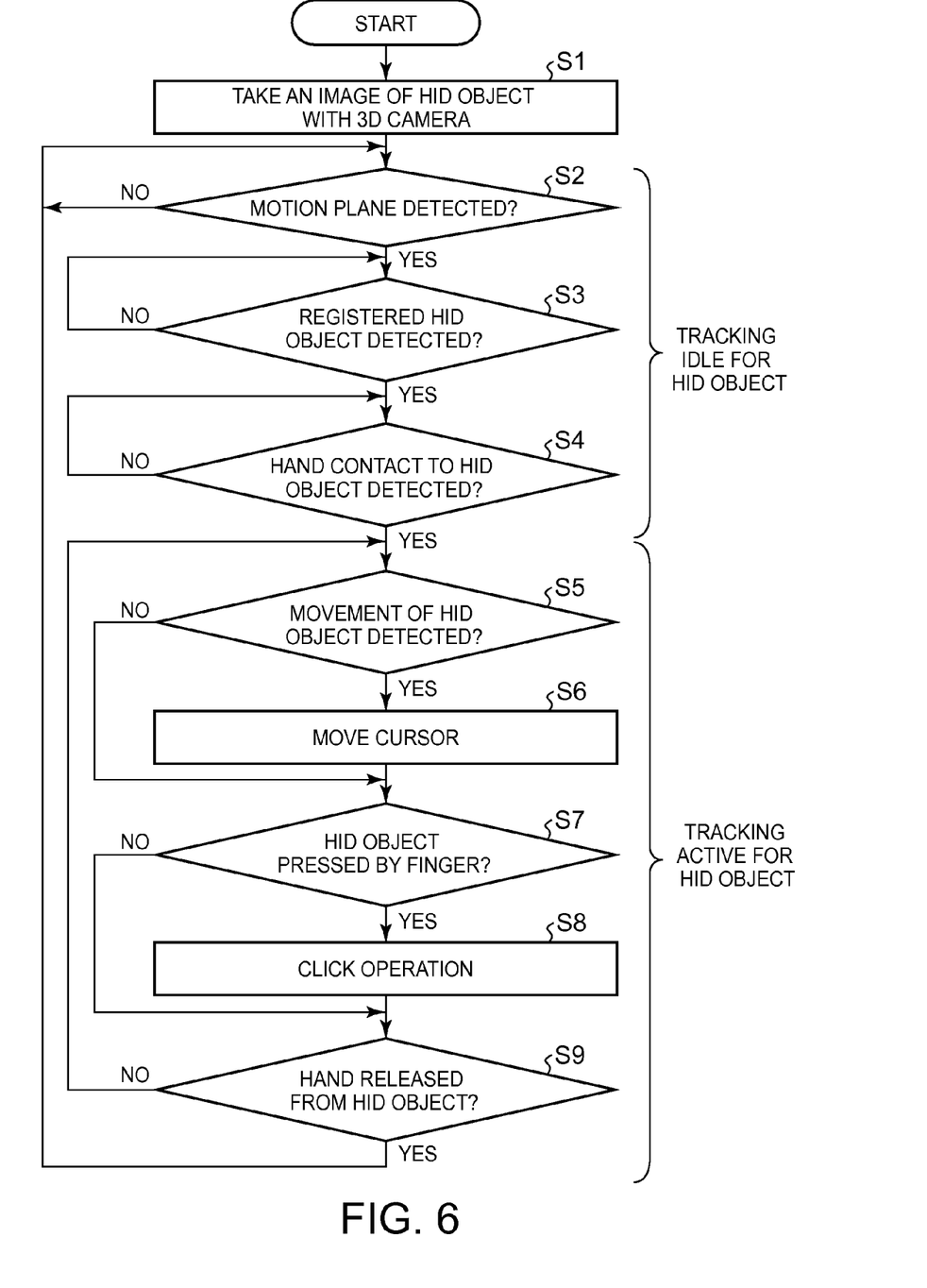
FIG. 6 is a flowchart that generally describes the processing by the mouse emulation application program.

An embodiment as shown in FIG. 5 and FIG. 6, describes mouse emulation processing by the mouse emulating application program 47. In the mouse emulation processing, the 3D camera device 50 takes an image of the registered HID object 30 or the hand 31 of the operator who operates the HID object 30. The mouse emulating application program 47 then performs image processing on the image from the 3D camera device 50 for analysis to detect the movement of the HID object 30 or (virtual) left click or (virtual) right click operation by the finger 31a, 31b of the hand 31. Then the mouse emulating application program 47 moves the cursor 28 or performs left/right click processing in accordance with such a detection result.

FIG. 5 illustrates the functional configuration of the mouse emulating application program 47. The mouse emulating application program 47 includes a HID object registration unit 61, a HID valid/invalid determination unit 62 and a HID emulation unit 63.

The HID object registration unit 61 is to make the 3D camera device 50 take an image of the HID object 30 for registration. Specifically, the HID object registration unit 61 displays a guidance on the LCD 25 to let a user register the HID object 30, and then the user places a desired HID object 30 in the shooting area of the 3D camera 26 in accordance with the guidance. The 3D camera 26 takes an image of the HID object 30, and the HID object registration unit 61 registers the 3D image of the HID object 30 taken in a memory. An additional embodiment includes the ability to rotate the HID object 30 shooting it from a plurality of directions.

For instance, in the example illustrated in FIG. 2, a user places an orange 30 in the shooting area of the 3D camera 26 of the 3D camera device 50 in accordance with guidance (not illustrated) displayed by the HID object registration unit 61 on the LCD 25. Then, the 3D camera device 50 takes an image of the orange 30, and the HID object registration unit 61 registers the 3D image of the orange taken in a memory. This allows the user, when the user forgets to bring a mouse, for example, to register a nearby object, whereby the user can perform virtual mouse inputting by an operation similar to that using a mouse.

The HID valid/invalid determination unit 62 includes a plane detection unit 71, a HID object detection unit 72 and a hand contact detection unit 73. The plane detection unit 71 analyzes the image taken by the 3D camera device 50 to detect whether the motion plane 32 exists or not. A plane can be detected by a well-known method, and so their detailed descriptions are omitted. Herein the motion plane 32 is a plane to enable a reliable motion of the HID object 30, which may have a predetermined size, and its color is not limited.

The HID object detection unit 72 analyzes the image from the 3D camera device 50 to detect whether the HID object 30 registered by the HID object registration unit 61 exists or not on the motion plane 32. When the HID object detection unit 72 detects the HID object 30, the hand contact detection unit 73 analyzes the image from the 3D camera device 50 to detect whether the hand 31 is in contact with the HID object 30 or not. When the hand 31 is in contact with the HID object 30, the hand contact detection unit informs the HID emulation unit 63 as such. This makes Tracking of the HID object 30 by the HID emulation unit 63 Active (mouse function turns Active). The method for detecting the hand is well known, and thus the detailed descriptions are omitted.

When the HID emulation unit 63 is informed by the hand contact detection unit 73 that the hand 31 is in contact with the HID object 30, the HID emulation unit 63 starts tracking of the HID object 30. The HID emulation unit 63 includes a HID object coordinates tracking unit 81, a finger operation tracking unit 82 and an operation instruction unit 83.

The HID object coordinates tracking unit 81 analyzes the image from the 3D camera device 50 to detect a coordinates position of the HID object 30, thus detecting the movement of the HID object 30 and outputting the movement direction and the movement amount to the operation instruction unit 83. Specifically, the HID object coordinates tracking unit 81 detects a three-dimensional coordinate position ((X3D, Y3D, Z3D) of the HID object 30, and then converts it into a two-dimensional coordinates position (X2D, Y2D). Since the three-dimensional to two-dimensional coordinates conversion can be performed using a well-known method, their detailed descriptions are omitted. The three-dimensional coordinates position ((X3D, Y3D, Z3D) may be a barycentric position or a center position of the HID object 30. The HID object coordinates tracking unit 81 calculates the movement direction and the movement amount in the two-dimensional coordinates of the HID object 30, and outputs the resultant to the operation instruction unit 83.

The finger operation tracking unit 82 assigns the right-button function of a mouse to the first finger 31a and the left-button function of a mouse to the second finger 31b, and analyzes the image from the 3D camera device 50 to detect the coordinates of the first finger 31a or the second finger 31b to monitor the pressing operation of the first finger 31a or the second finger 31b with respect to the HID object 30 (see FIG. 3). For instance, when the finger operation tracking unit 82 detects the first finger 31a or the second finger 31b released from the HID object 30 once, followed by pressing (contact with) the HID object 30, then the finger operation tracking unit can determine it as click operation of right button or left button. The finger operation tracking unit 82 determines whether right button or left button is clicked or not, and outputs the determination result to the operation instruction unit 83. The finger to which the function of right button and left button of a mouse is assigned is not limited to the first finger 31a or the second finger 31b, and such a function may be assigned to other fingers.

The operation instruction unit 83 moves the cursor 28 in accordance with the movement direction and the movement amount of the HID object 30 that are input from the HID object coordinates tracking unit 81. When the operation instruction unit is informed of clicking operation of right button or left button from the finger operation tracking unit 82, then the operation instruction unit 83 executes right click operation or left click operation.

FIG. 6 is a flowchart that generally describes the processing by the mouse emulating application program 47 of FIG. 5. When the mouse emulating application program 47 starts, the mouse emulating application program 47 activates the 3D camera device 50 to let the 3D camera device take a three-dimensional image and output the same.

Firstly, the HID object registration unit 61 makes the 3D camera device 50 take an image of the HID object 30 and registers a three-dimensional image thereof (Step S1). The plane detection unit 71 analyzes the image taken by the 3D camera device 50 and determines whether the motion plane 32 exists or not (Step S2). When the plane detection unit 71 determines that the motion plane 32 exists ("Yes" at Step S2), the HID object detection unit 72 analyzes the image taken by the 3D camera device 50 and determines whether the HID object 30 registered by the HID object registration unit 61 is located on the motion plane 32 or not (Step S3). When the HID object detection unit 72 determines that the HID object 30 registered by the HID object registration unit 61 is located on the motion plane 32 ("Yes" at Step S3), the hand contact detection unit 73 analyzes the image from the 3D camera device 50 and determines whether the hand 31 is in contact with the HID object 30 or not (Step S4).

When it is determined that the hand 31 is in contact with the HID object 30 ("Yes" at Step S4), the hand contact detection unit 73 informs the HID emulation unit 63 as such. This makes tracking of the HID object 30 by the HID emulation unit 63 active (mouse function turns active). The mouse function turns active when contact of the hand 31 with the HID object 30 is detected, this reduces operating error, which might occur from the operation with a hand only.

At Step S5, the HID object coordinates tracking unit 81 analyzes the image from the 3D camera device 50 and determines whether the HID object 30 is moved or not (Step S5). When it is determined that the HID object 30 is moved ("Yes" at Step S5) the HID object coordinates tracking unit 81 outputs the movement direction and the movement amount of the HID object 30 to the operation instruction unit 83. The operation instruction unit 83 moves the cursor in accordance with the movement direction and the movement amount of the HID object 30 (Step S6). When it is not determined that the HID object 30 is moved ("No" at Step S5), the procedure shifts to Step S7.

At Step S7, the finger operation tracking unit 82 determines whether the pressing of the first finger 31a or the second finger 31b with respect to the HID object 30 is performed or not. When the first finger 31a or the second finger 31b is pressed with respect to the HID object 30 ("Yes" at Step S7), the finger operation tracking unit outputs right click or left click being performed to the operation instruction unit 83, and then the operation instruction unit 83 performs right click operation or left click operation (Step S8).

When the first finger 31a or the second finger 31b is not pressed with respect to the HID object 30 ("No" at Step S7), the procedure shifts to Step S9. At Step S9, the hand contact detection unit 73 determines whether the hand 31 is released from the HID object 30 (the state where the hand 31 is not placed on the HID object 30) or not. When the hand 31 is not released from the HID object 30 ("No" at Step S9), the procedure returns to Step S5.

Alternatively, when the HID object 30 is released from the hand 31 ("Yes" at Step S9), the procedure returns to Step S2, and then tracking of the HID object 30 by the HID emulation unit 63 turns idle (mouse function turns idle). Additionally, detection of the motion plane 32, the registered HID object 30, contact of a hand with the HID object 30 is performed again (Steps S2 to S4), and when they are detected, tracking of the HID object 30 by the HID emulation unit 63 turns active (mouse function turns active). In this way, releasing of the user's hand 31 from the HID object 30 causes interruption of the use of the mouse function. That is, when the user wants to use the mouse function, the user can place a hand on the HID object 30, and so the ease of use for the user can be improved as compared to a method by hand gesture only.

As described above, the example includes: the 3D camera device 50 that takes an image of an object to acquire a 3D image thereof; the HID object registration unit 61 that makes the 3D camera device 50 take an image of a HID object and registers the HID object; the plane detection unit 71 that analyzes the image taken by the 3D camera device 50 to detect a motion plane 32 on which the HID object 30 moves. The HID object detection unit 72 that analyzes the image taken by the 3D camera device 50 to detect the registered HID object 30; the hand contact detection unit 73 that, when the HID object detection unit 72 detects the registered HID object 30, analyzes the image taken by the 3D camera device 50 to detect whether a hand 31 is in contact with the HID object 30 or not; the HID object coordinates tracking unit 81 and the finger operation tracking unit 82 that, when the hand contact detection unit 73 detects a contact of the hand 31 with the HID object 30, detect the movement of the HID object 30 and a pressing operation of a finger with respect to the HID object 30; and the operation instruction unit 83 that moves a cursor 28 and performs left/right click operation in accordance with the movement of the HID object 30 and the pressing operation of a finger with respect to the HID object 30 to emulate a mouse input operation. With this configuration, emulation of a mouse input operation with a hand is enabled while improving the ease of use by a user and reducing an operating error.

Additionally, according to an embodiment, a mouse operation is emulated by operating the HID object 30 with a hand, so the hand can be supported by the HID object 30, causing less fatigue of the hand and enabling the same feeling for the input operation as that of the operation with a mouse. Further since the mouse function is effective only when a hand is in contact with the HID object 30, operating errors and detection errors can be reduced.

Although the above example exemplifies the case where a left button operation and a right button operation are performed by pressing the first and second fingers 31a and 31b with respect to the HID object 30, it may be configured to operate a scroll button using a third finger.

Additionally, although the above example exemplifies the case where a left button operation and a right button operation are performed by pressing the first and second fingers 31a and 31b with respect to the HID object 30, the present embodiment is not solely limited this. For example, in the case where the HID object 30 has a part of a characteristic shape, when a contact of a finger with such a part of a characteristic shape is detected, the mouse emulating application program 47 may perform a predetermined input operation. Specifically, when the HID object 30 is a smartphone, for example, a left click operation may be performed in response to the detection of a contact of a finger with a home button of the smartphone, and a right click operation may be performed in response to the detection of a contact of a finger with a microphone of the smartphone.

Furthermore, in the case where the HID object 30 has a region of a predetermined color, a contact of a finger with such a region of predetermined color could cause the mouse emulating application program 47 to perform a predetermined input operation. Specifically, when the HID object 30 has a red region and blue region, for example, a left click operation may be performed in response to the detection of contact with a finger and the red region of the HID object 30. Alternatively, a right click operation may be performed in response to the detection of contact with a finger and the blue region of the smartphone.

In the above example, the mouse emulating application program 47 executes mouse emulation processing. Alternatively, a driver program, a utility program or an OS may execute the processing. The 3D camera device 50 may execute a part or the entire of the mouse emulation processing.

The above example exemplifies a laptop as the information handling device, which is not a limiting example, and the embodiment is applicable to other apparatuses such as a desktop type computer, a tablet, a PDA, a smartphone, a mobile phone, and the like.

As stated above, an input apparatus, an input method and a computer-executable program according to an embodiment are widely applicable to the emulation of an input operation with a pointing device.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
capturing, using a camera, an image of a movable object, separate from an information handling device;
thereafter, based upon detecting a hand of the user contacting the movable object, capturing, using the camera, movement of the hand of the user with respect to the movable object;
detecting, while the hand of the user is in contact with the movable object, a gesture of the hand of the user with respect to the movable object that emulates an input operation of a pointing device; and
controlling an application running on the information handling device based on the gesture.

2. The method of claim 1, wherein the detecting further comprises detecting, in a plane, hand contact and movable object motion.

3. The method of claim 1, further comprising registering a particular movable object for future identification.

4. The method of claim 3, wherein the registering comprises assigning attributes to at least one particular feature of the movable object.

5. The method of claim 1, wherein said controlling an application comprises moving an on-screen indicator.

6. The method of claim 1, wherein said controlling an application comprises performing an action associated with a mouse button click.

7. The method of claim 6, wherein said gesture is selected from the group consisting of a single finger click gesture, a multiple finger click gesture, a right finger click gesture, a left finger click gesture, and a scrolling finger flick gesture.

8. The method of claim 1, wherein the camera comprises a three dimensional camera.

9. The method of claim 1, further comprising additionally detecting that gesture input comprises the user gesture not in contact with the movable object and thereafter controlling of the application ceases.

10. An apparatus, comprising:
a camera;
a processor operatively coupled to the camera; and
a memory having instructions that are stored and executed by the processor to:
capture, using the camera, an image of a movable object, separate from the apparatus;
thereafter, based upon detecting a hand of the user contacting the movable object, capture, using the camera, movement of the hand of the user with respect to the movable object;
detect, while the hand of the user is in contact with the movable object, a gesture of the hand of the user with respect to the movable object that emulates an input operation of a pointing device; and
control an application running on the information handling device based on the gesture.

11. The apparatus of claim 10, wherein to detect further comprises detecting, in a plane, hand contact and movable object motion.

12. The apparatus of claim 10, wherein the instructions are executed to register a particular movable object for future identification.

13. The apparatus of claim 12, wherein to register comprises assigning attributes to at least one particular feature of the movable object.

14. The apparatus of claim 10, wherein to control an application comprises moving an on-screen indicator.

15. The apparatus of claim 10, wherein to control an application comprises performing an action associated with a mouse button click.

16. The apparatus of claim 15, wherein said gesture is selected from the group consisting of a single finger click gesture, a multiple finger click gesture, a right finger click gesture, a left finger click gesture, and a scrolling finger flick gesture.

17. The apparatus of claim 10, wherein the camera comprises a three dimensional camera.

18. An input apparatus, comprising:
a processor; and
a memory having instructions that executed by the processor to:
accept, from a camera, an image of a movable object, separate from an information handling device;
thereafter, based upon detecting a hand of the user contacting the movable object, accept movement of the hand of the user with respect to the movable object;
detect, while the hand of the user is in contact with the movable object, a gesture of the hand of the user with respect to the movable object that emulates an input operation of a pointing device; and
control an application running on the information handling device based on the gesture.

* * * * *